United States Patent [19]

Lundberg

[11] Patent Number: 4,999,038
[45] Date of Patent: Mar. 12, 1991

[54] FILTER UNIT

[76] Inventor: Bo E. H. Lundberg, Heroes de Padierna No. 111, Col. San. Jeromino Lidice, Mexico City 10200, Mexico

[21] Appl. No.: 307,609

[22] Filed: Feb. 7, 1989

[51] Int. Cl.$^5$ .................. B01D 29/00; B01D 39/00
[52] U.S. Cl. ............................... 55/491; 55/495; 55/501; 55/509; 55/511; 55/513; 210/483; 428/192
[58] Field of Search ............... 428/192, 121, 123, 131, 428/81, 132; 55/491, 495, 497, 499, 493, 501, 509, 511, 518; 210/483

[56] References Cited

U.S. PATENT DOCUMENTS 2,981,367 4/1961 Sprouse ............................. 55/491

FOREIGN PATENT DOCUMENTS 0113565 7/1984 European Pat. Off. .

Primary Examiner—Merrell C. Cashion, Jr.
Assistant Examiner—Amy Hulina

Attorney, Agent, or Firm—McAulay Fisher Nissen & Goldberg

[57] ABSTRACT

The present invention relates to a filter unit having a sheet of filtering material mounted on a first frame and a second frame received within and below the first frame. The second frame is configured such that the filtering material is tightly held between the first and second frames and the filtering material is stretched by the second frame. In accordance with one of the aspects of the present invention, the second frame is provided with ear members. The ear members are sized such that the ears penetrate the filtering material and hold the first frame tightly between the ear members. The ear members reinforce the first frame by the second frame, through a mechanical interconnection of the frames and also, prevent slippage of the filtering material. In accordance with another of the aspects of the present invention, preferably, a coating of rubber covering the second frame further prevents slippage of the filtering material between the frames by insuring a tight fit between the first and second frames and the filtering material.

20 Claims, 5 Drawing Sheets ically incorporated by
FILTER UNIT

FIELD OF THE INVENTION

The present invention relates to a filter unit in which filtering material in the form of a sheet or laminate is supported or stretched upon a pair of superimposed frames that are separable to allow replacement of the filtering sheet or material when the same becomes torn, damaged or soiled.

BACKGROUND OF THE INVENTION

In European patent application, Publication No. 0113565, of which I am the inventor and the specification and drawings of which are hereby incorporated by reference, a filter unit is disclosed that comprises a rectangular sheet of filtering material and a pair of first and second superimposed frames. The first frame carries the filtering material and the second frame, which is designed to stretch and support the filtering material, is received within and below the first frame. The sheet of filtering material has a width and length greater than the width and length of the first and second frames and has a marginal portion surrounding a central portion. The marginal portion is folded over the first frame and doubled back upon the central portion. When the second frame is received within the first frame, the sheet of filtering material is held between the first and second frames at the marginal portion of the sheet of filtering material, with the second frame also stretching the sheet of filtering material so that it remains taut when supported by the frames.

The sheet of filtering material preferably has a rectangular form incorporating a set of four cut-off corners or vertices. Each of the cut-off corners are in the form of an isosceles triangle, and preferably are all of the same configuration. When the sheet of filtering material is folded over the first frame, the absence of the corners or vertices inhibits the bunching and bulging of the sheet of filtering material around the corners of the first frame. Such bulging or bunching of the sheet of filtering material is undesirable because it makes it difficult, if not impossible, to install an assembled filter unit formed of the two frames and the sheet of filtering material into a U-channel support.

Since many synthetic, non-woven filtering materials have the property of memory, difficulties arise in retaining the marginal portion of the sheet of filtering material folded over the first frame and doubled back upon the central portion during the assembly of the filter unit. Specifically, pressure must be continually exerted against the marginal portion to retain it in its folded condition on the first frame, during reception of the second frame within the first frame. If the pressure were exerted manually, one or more hands would be required to exert the pressure and another hand would be required to insert the second frame into the first frame. Such manual assembly would increase the unit cost of each filter unit to an unacceptable level. In order to overcome this problem, heat, pressure and steam may be used to preform the marginal portion of the filtering material in its folded condition over the first frame. Additionally, or alternatively, adhesive may be used, preferably in the form of a double-sided adhesive strip connected to the sheet of filtering material adjacent the marginal portion. The strip is preferably provided with release paper that is removed to attach the filtering material to the first frame.

Once assembled, the marginal portion of the sheet of fitting material peripherally seals the filter unit by surrounding the first and second frames. The advantage of such 1 peripheral seal is that the filter unit may be mounted without additional brackets, gaskets, etc. For instance, the filter unit may be mounted within a close fitting duct with the filter unit being held in position solely by stops underlying the filter unit. The peripheral seal of the marginal portion prevents air leakage between the walls of the duct and the filter unit. Air leaks are also prevented between the first and second frames of the filter unit because the marginal portion is tightly held between the first and second frames.

Problems may arise in connection with the filter unit disclosed in my aforenoted prior European application. One problem is that when the filter unit is sufficiently elongated, the lengthwise portions of the frames may flex and bow. In an attempt to overcome such a possible drawback, cross-bracing was incorporated into the design. Such cross-bracing preferably comprises a pair of cross-braces attached to the second frame. The cross-braces have upturned end portions to form a set of four ear members. The ear members contribute to the alignment of the first frame and the sheet of filtering material with the second frame.

Another problem with the prior art frame assembly relates to the holding effect of the various components of the filter unit. Specifically, the marginal portion of the sheet of filtering material, over a period of time, tends to slip between the frames in response to air pressure acting on the sheet of filtering material. The end result of such slippage is that an outward bulge is produced in the filtering material in a direction of the air flow.

SUMMARY OF THE INVENTION

A primary purpose of the present invention is to provide ear members which are sized to penetrate through the marginal portion of the sheet of filtering material adjacent to the first and second frames and to contact the outer periphery of the first frame thereby holding the first frame between the ear members. This feature provides for a mechanical interconnection between the frames, when the frames are in an assembled condition, such that the second frame reinforces the first frame by transmitting flexural and bowing forces applied to the first frame to the second frame.

The cross-braces do not have to be included. However, when the ears can be formed by upturned ends as an extension of the cross-braces, the entire structure is further strengthened as well as the frame assembly. The ear members of the present invention, which extend through the sheet of filtering material, in addition to the reinforcing function also are effective to prevent slippage of the sheet of filtering material because such ear members penetrate through the sheet of filtering material to effect a further holding.

Another feature is that the second frame is also preferably provided with an outer covering of cushioning material, such as rubber. The cushioning material insures that a tight fit is produced between the sheet of filtering material and the frames to prevent movement of the filtering material out of engagement with the frames when the filter unit is assembled.

According to the invention, the filter unit comprises first and second frames for mounting and holding a stretchable sheet of filtering material, the stretchable sheet of filtering material being sized larger in all dimensions than the first frame and having a central portion for filtration with a marginal portion surrounding the central portion for peripherally sealing the filter unit. The marginal portion is folded over the first frame and doubled over the central portion. The second frame is received within and below the first frame to stretch the sheet of filtering material and have it bear against the marginal portion of the sheet such that the sheet is tightly held between the first and second frames and the marginal portion of the sheet of filtering material prevents air leaks between the first and second frames.

In one aspect of the present invention, a reinforcement mechanism is provided which is connected to the second frame and is provided for reinforcing the first frame by the second frame and for preventing slippage of the sheet of filtering material. The reinforcement mechanism includes at least one pair of oppositely disposed ear members for penetrating through the marginal portion of the sheet of filtering material at, at least one pair of opposite locations adjacent to the first and second frames and in contact with the outer periphery of the first frame so that the first frame is held between the at least one pair of ear members.

In one aspect of the invention, the ear members penetrate the material on opposite sides of a central portion thereof in two vertically spaced positions. In another aspect of the invention, the ear members only penetrate the material once on opposite sides of the central portion thereof. Dual penetration has a greater holding power than when a single penetration is used. A single penetration, however, facilitates assembly of a filter unit in accordance with the present invention over one incorporating a dual penetration by reducing the amount of flexure required for the frames and ear members during assembly.

In another aspect, the invention provides for a rubber covering of cushioning material to be applied to the second frame and also, possibly to the first frame for preventing slippage of the sheet of filtering material between the first and second frames.

BRIEF DESCRIPTION OF THE DRAWINGS

In order that the invention may be more clearly understood and readily carried into effect, the same will now be described in connection with the accompanying drawings.

In the accompanying drawings, the same reference numerals are employed to illustrate similar parts of the various embodiments illustrated and discussed hereinbelow.

DESCRIPTION OF THE PREFERRED EMBODIMENTS

Figure 1:
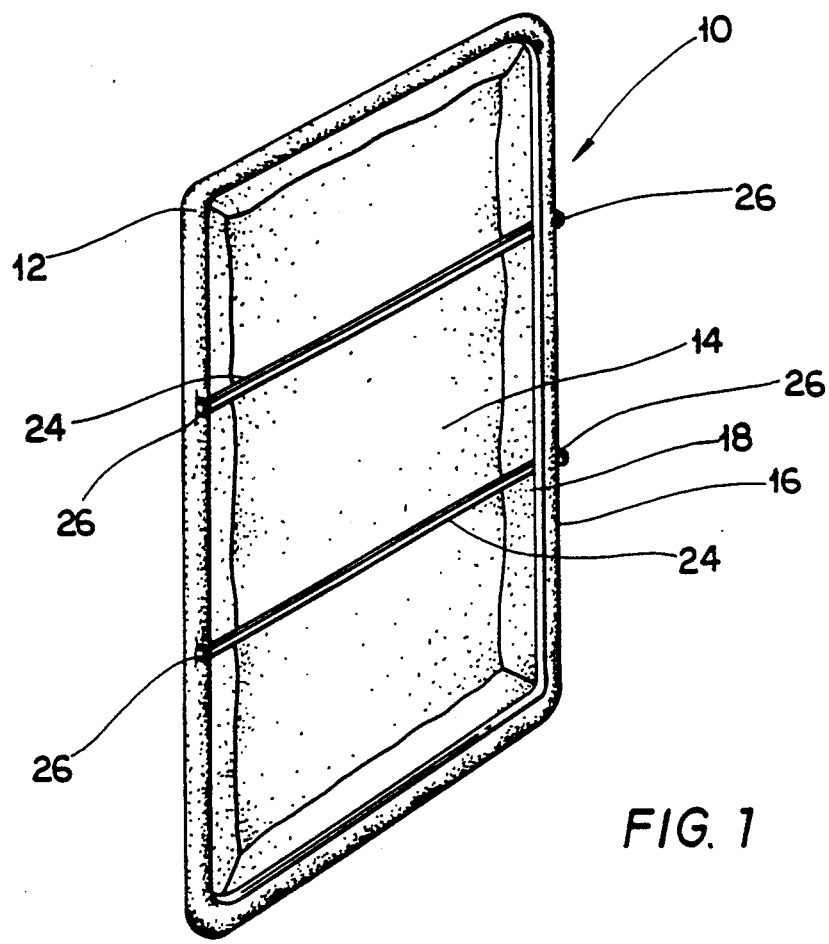
FIG. 1 is a perspective view of a filter unit in accordance with the invention shown completely assembled.

Referring now more particularly to the drawings and in particular to FIGS. 1 through 4A and 4B, filter unit 10, in accordance with the present invention, comprises a composite frame 12, a sheet of filtering material 14 and ears or ear members 26 penetrating the filtering material 14.

Composite frame 12 includes first frame 16 and second frame 18. In accordance with the embodiment illustrated in FIG. 4A, second frame 18 is dimensioned slightly smaller than first frame 16. First and second frames 16 and 18 are formed from wire or other suitable material to provide filter unit 10 with a strength suitable to support filtering material 14, while at the same time, stretching filtering material 14.

Each of the first and second frames 16 and 18 are preferably formed of lengthwise members 16A, 16B; and 18A, 18B and transverse members 16C, 16D: and 18C, 18D. The members are connected in an essentially rectangular configuration. While the above noted structure is shown and described, other geometrical forms for frames 16 and 18 are possible as would occur to those skilled in the art. For instance, frames 16 and 18 may take the form of circular rings with a cylindrical cross-section.

Second frame 18, which will be discussed hereinafter, stretches sheet 14 and is provided with cross-braces 24 to strengthen longitudinal members 18A and 18B. Cross-braces 24 may also serve as supports for filtering material 14 when the filter unit 10 is assembled. While only two cross-braces are shown, there can be more or less cross-braces 24. Filter unit 10 preferably incorporates a pair of such cross-braces 24. Each of the cross-braces 24 may be provided with upwardly bent ends to form the ear members 26 which will be described in greater detail hereinafter.

Figure 4A:
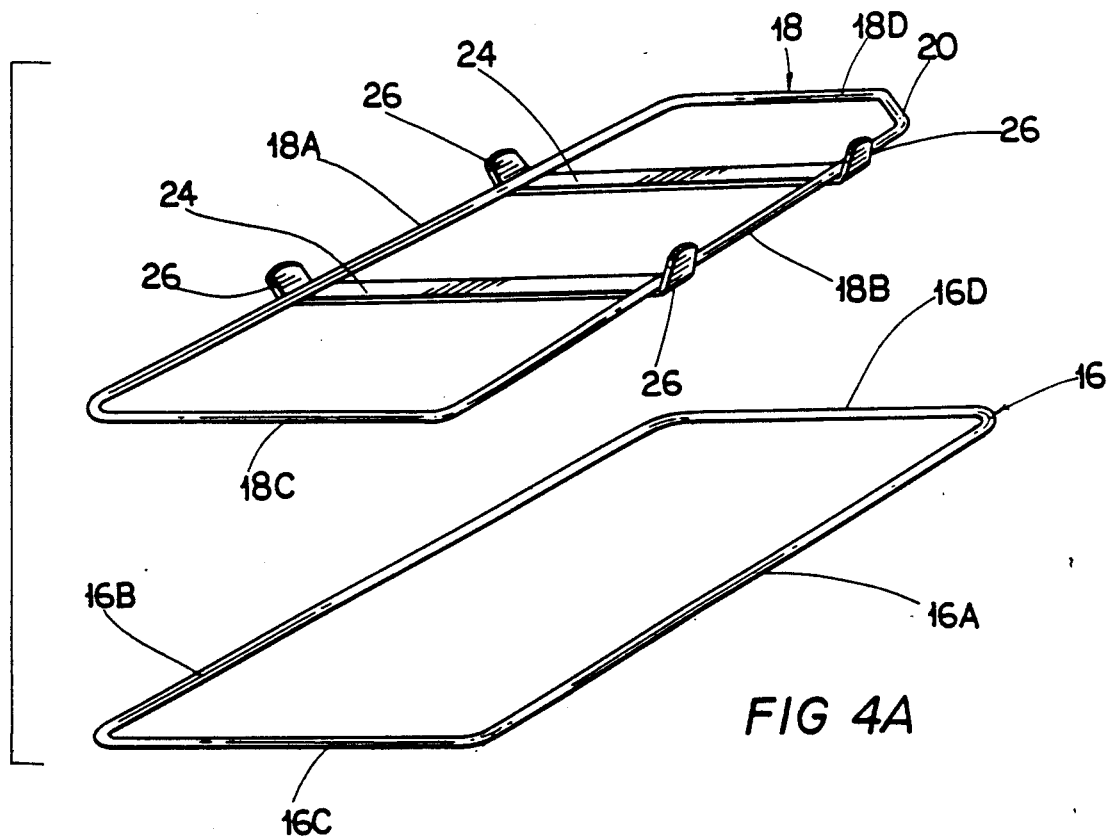
FIGS. 4A and 4B are perspective views of two frames used to assemble, stretch and support the sheet of filtering material in accordance with two embodiments of the present invention.
Figure 4B:
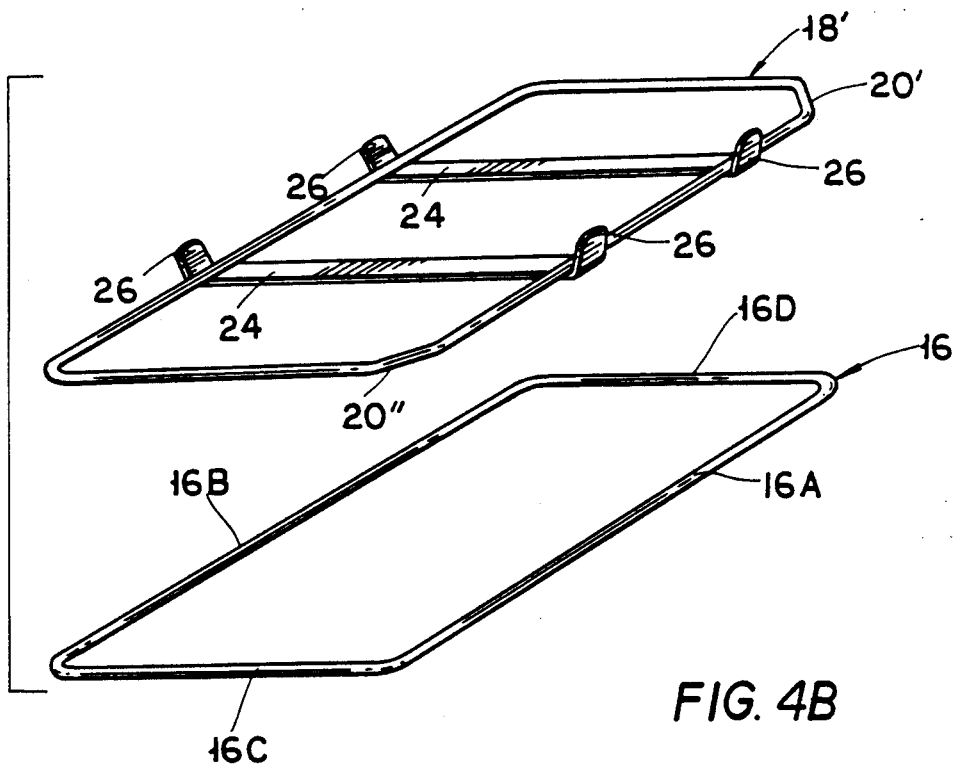

It is understood that, in place of cross-braces 24, second frame 18 may be provided with a mesh attached thereto or possibly an apertured plate. In such case, ear members 26 are separately provided and attached to longitudinal members 18A and 18B of second frame 18. Second frame 18 may also have at least one flattened vertex or corner 20 that is cut-away in order to facilitate the assembling of filter unit 10. Other corners can be provided with a flattened configuration within the scope of the present invention or; alternatively, frame 18 can be formed without any flattened or cut-away vertices. As illustrated in FIG. 4B, second frame 18' is provided with two flattened corners 20' and 20" in order to facilitate assembly of first frame 16 and second frame 18'.

Figure 2A:
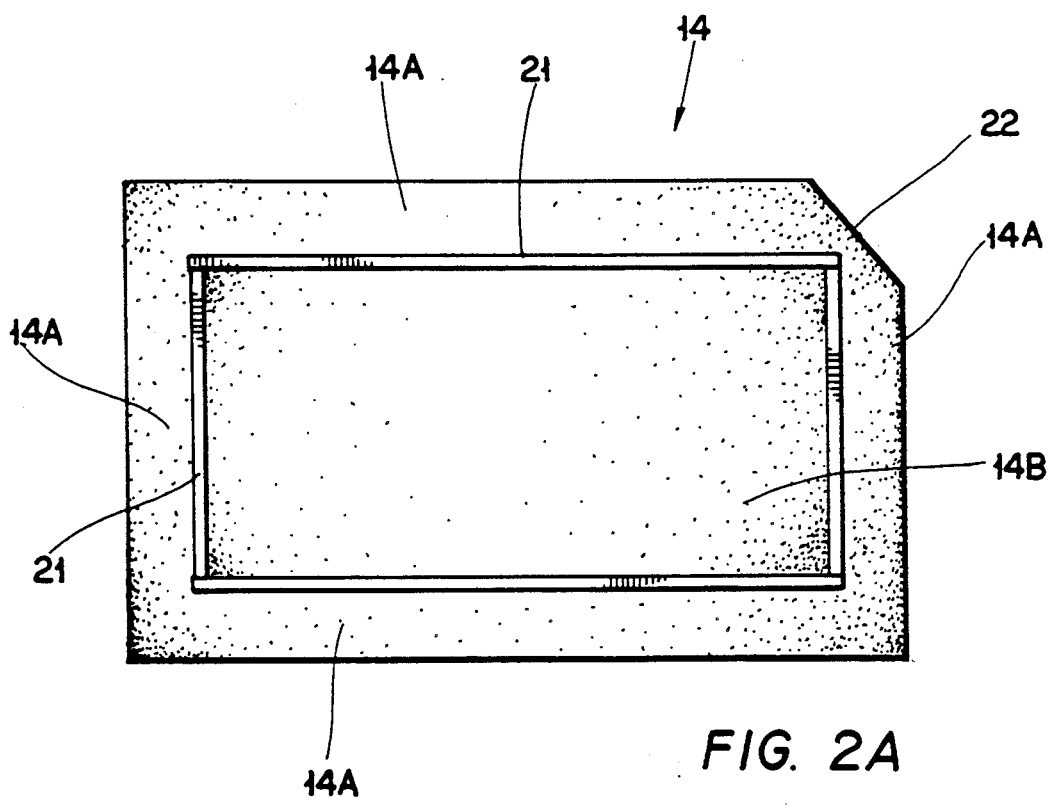
FIGS. 2A and 2B are top plan views of the filtering material in accordance with two embodiments of the present invention.

With particular reference now to FIG. 2A, filtering material 14 has an essentially rectangular configuration including an outer marginal portion 14A surrounding a central portion 14B. Filtering material 14 is sized larger than first frame 16 to allow marginal portion 14A to be folded over first frame 16 and doubled back over central portion 14B. One corner 22 of filtering material 14 is preferably trimmed at a 45° angle in marginal portion 14A to avoid the accumulation of material at one corner of first frame 16 and, thus, one corner of the assembled filter unit.

The one trimmed corner 22 facilitates the mounting of the filter unit into a U-channel support by permitting the one corner of the assembled filter unit, in which material is not accumulated by virtue of trimmed corner 22, to be easily inserted into the U-channel support before the other corners of the filter unit. The other corners of the filter unit, in which material is accumulated, are then inserted into the U-channel support by tucking the accumulated material into the support.

Figure 2B:
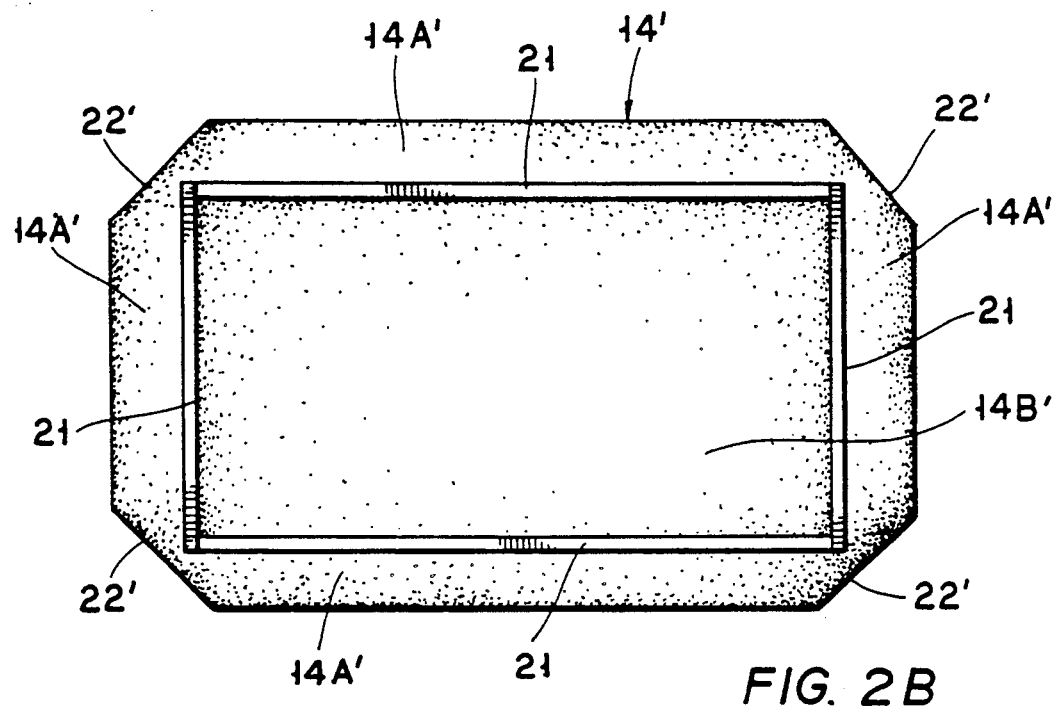

As illustrated in FIG. 2B, a sheet of filtering material 14' may be provided with all four corners 22' trimmed at a 45° angle in the marginal portion 14A' thereof to avoid accumulation of material at all four corners of the assembled filter unit. Filtering material 14' is, in all other respects, identical to filtering material 14 and has a central portion 14B' identical to central portion 14B of filtering material 14.

Figure 3:
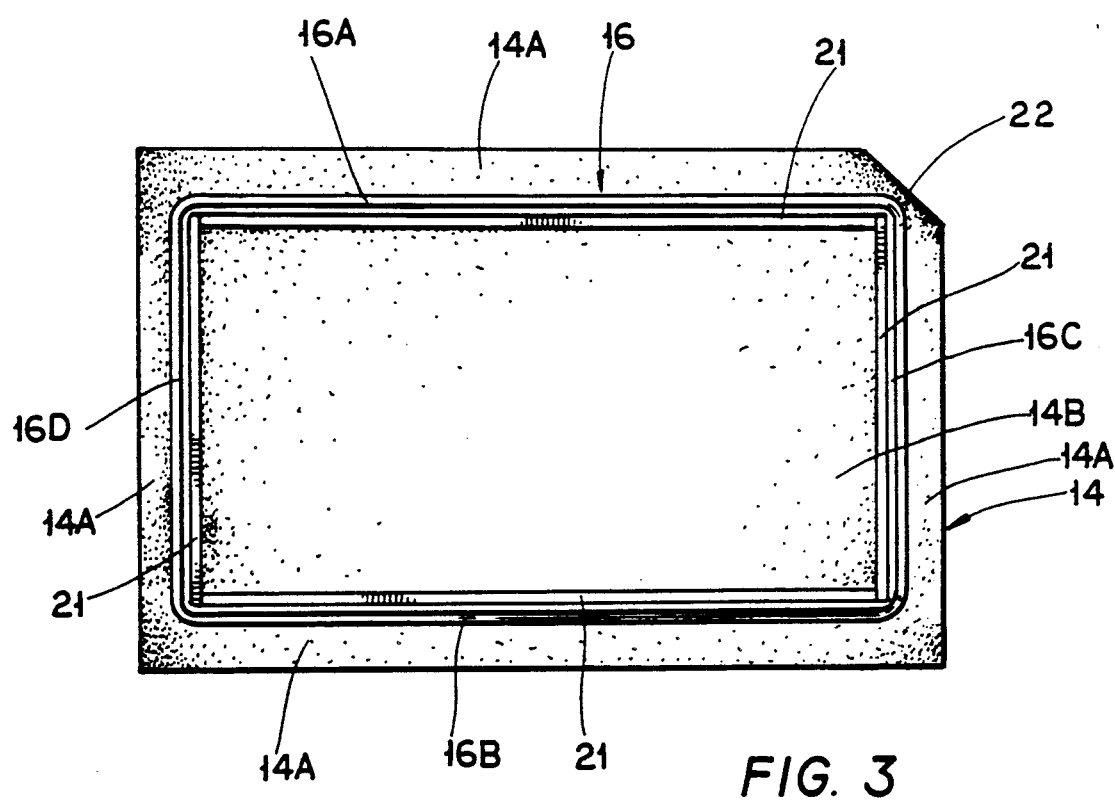
FIG. 3 is a front view of the filtering material, prior to mounting, positioned on a first frame.
Figure 5A:
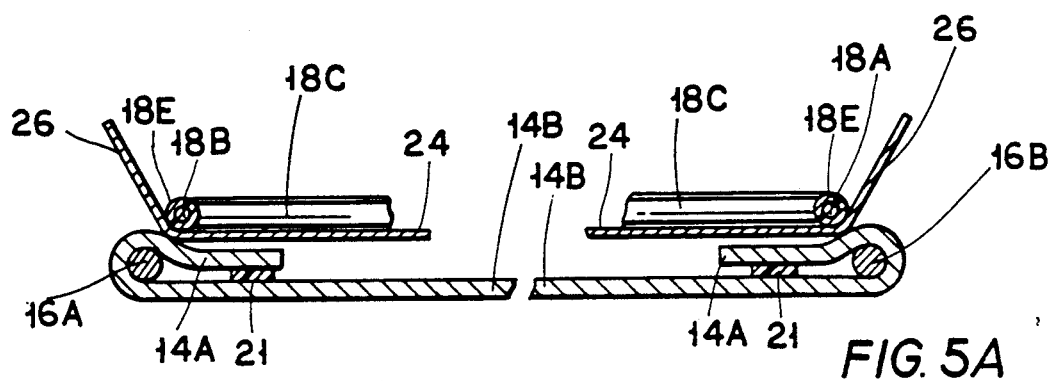
FIGS. 5A to 5C are sectional views according to the embodiment shown in FIG. 4A illustrating the various assembly stages of the filter unit.

Referring to FIGS. 3 and 5A, central portion 14B, or for that matter 14B', is preferably provided with a set of double-sized adhesive strips 21 joined to the filtering material by means of a contact adhesive. Each free surface of an adhesive strip 21 is preferably provided with tear-off paper to protect the adhesive thereon when the filtering material is positioned prior to mounting onto the frame 16.

In accordance with the preferred embodiment of the present invention as shown in FIGS. 3 and 5A, marginal portion 14A, from its FIG. 3 position, flat against first frame 16, is folded by bending marginal portion 14A about lengthwise and transverse members 16A, 16B, 16C and 16D to a position that can best be seen in FIG. 5A, in which marginal portion 14A is doubled over central portion 14B.

Many non-woven filtering materials have memory, and in order to facilitate the mounting of a filtering material 14 with a memory onto frame 16, preferably heat, pressure and steam is applied to pre-fold marginal portion 14A about the lengthwise and transverse members of frame 16. After the pre-folding of marginal portion 14A under application of heat, pressure and steam, the tear-off paper is removed from adhesive strips 21 to retain filtering material 14 in the mounted condition on first frame 16.

Figure 5B:
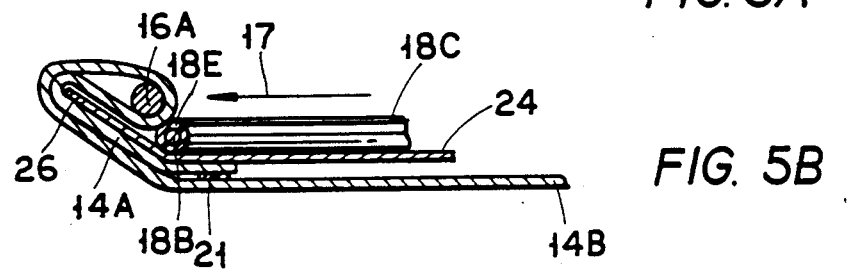
Figure 5C:
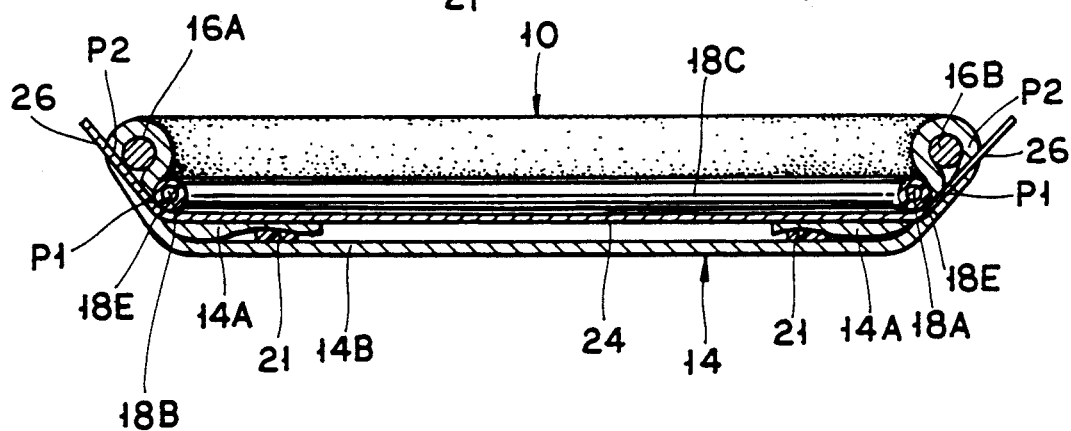

With reference now to FIGS. 5B and 5C, second frame 18 is dimensioned slightly smaller than first frame 16 in order to facilitate the assembly of first and second frames 16 and 18. Assembly is also facilitated by fabricating the frames from a flexible material. It is understood, however, that first and second frames 16 and 18 could be formed with substantially the same dimensions. In such case the assembly of the frames would be more difficult, but could be accomplished through flexure of the frames alone.

After filtering material 14 is mounted on first frame 16 as described above, second frame 18 is arranged over first frame 16 in the manner illustrated in FIG. 5A with one of its lengthwise or transverse members arranged adjacent to a corresponding member of frame 16. Thereafter, as illustrated in FIG. 5B, the same member, which in this case is lengthwise member 18B, is forced under corresponding lengthwise member 16A of first frame 16 in the direction of arrow 17. As illustrated in FIG. 5C, member 18B is then located directly below member 16A with ear member 26 forced through marginal portion 14A of sheet 14 at locations P1 and P2. Locations P1 and P2 are situated in marginal portion 14A of filtering material 14 and on opposite sides of the central portion adjacent to first and second frames 16 and 18. As illustrated, the two locations P2 forming a pair of locations P2 are situated above the two locations forming a pair of locations P1. Thereafter, the same positioning and reception of the members of frame 18 is accomplished within and below first frame 16 with the cut-down or trimmed vertex 20 (or in the case of second frame 18' of FIG. 4B, vertices 20' and 20") being inserted last. Since a right angle corner is not present at the vertex 20, second frame 18 may be inserted with minimal effort and flexing of the frames.

Once assembled, second frame 18 bears against the marginal portion 14A such that sheet 14 is tightly held between first and second frames 16 and 18. Moreover, the diameter of the lengthwise and transverse members forming second frame 18 produces a consequent stretching of the filtering material 14 when the frames are assembled.

With continued reference to FIG. 5C, since second frame 18 is dimensioned slightly smaller than first frame 16, ear members 26 are outwardly angled from the vertical to contact the outer periphery of second frame 18, when the filter unit is assembled, such that first frame 16 is held between ear members 26. As previously mentioned, ear members 26 accomplish a mechanical interconnection between first and second frames 16 and 18. Specifically, when forces are applied to the assembled filter unit which would produce an outward flexure or bowing of lengthwise members 16A–16B, and 18A–18B, any flexure of lengthwise members 16A and 16B is transmitted by ear members 26 to lengthwise members 18A and 18B. Thus, second frame 18 reinforces first frame 16.

If first and second frames 16 and 18 were equally dimensioned, the ear numbers could be provided in a vertical orientation. Moreover, even in the illustrated preferred embodiment in which first and second frames 16 and 18 are of unequal size, the ear members could also be formed with a vertical orientation. As can be appreciated, such vertically oriented ears would be designed to outwardly flex or bend during assembly.

Figure 6:
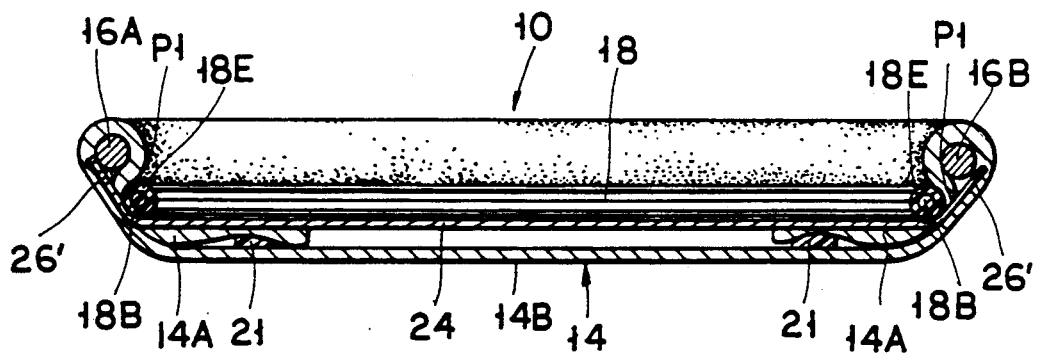
FIG. 6 is a cross-sectional view of another embodiment of an assembled filter unit.

Referring now more particularly to FIG. 6, showing another embodiment of the present invention, ear members 26' may be sized so that they have a length sufficient only to penetrate marginal portion 14A at oppositely spaced locations P1. In such embodiment, although ear members 26' do not penetrate marginal portion 14A at locations P2, they contact the outer periphery of first frame 16, thereby mechanically interconnecting first frame 16 with second frame 18.

In either the embodiment illustrated in FIG. 6 or the embodiment illustrated in FIGS. 1, 5A through 5C, penetration of ears or ear members 26 or 26' into marginal portion 14A of filtering material 14 presents slippage of filtering material 14 relative to the frames. It will therefore be appreciated, the embodiment of FIGS. 1, 5A through 5C provides a greater holding force onto filtering material 14 since ears or ear members 26 penetrate marginal portion 14A at four points, namely, P1 and P2 both spaced on opposite sides of the central portion 14B and at spaced points substantially orthogonal to the opposite sides. As may also be appreciated, since ears or ear members 26' of the embodiment of FIG. 6 are sized smaller than ears 26 of the embodiment of FIGS. 1, 5A through 5C, reception of second frame 18 within and below first frame 16 is more easily accomplished because the amount of flexure of the frame and ear members required for ears 26' to clear lengthwise members 16A and 16B is thereby reduced.

The present invention, in another of its aspects, provides further means for preventing slippage of the filtering material 14 relative to frames 16 and 18 after the frames are assembled. This is accomplished by preferably an outer coating of cushioning material 18E, preferably rubber, applied to second frame 18 which acts in the manner of a gasket to produce a tight fit between filtering material 14 and first and second frames 16 and 18.

Figure 7:
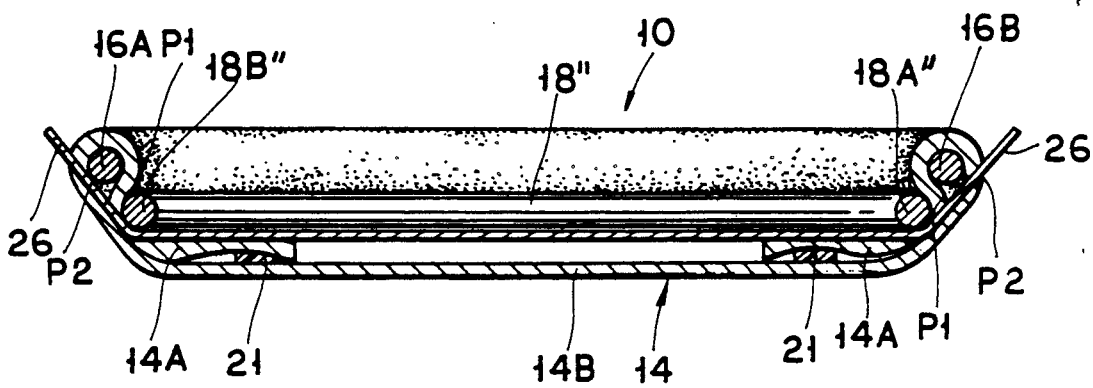
FIG. 7 is a cross-sectional view of another embodiment of an assembled filter unit.

It is possible in any conceivable embodiment of the present invention to delete the rubber coating as illustrated by the embodiment shown in FIG. 7. In FIG. 7, frames 16 and 18″ incorporate lengthwise and transverse members, such as can be seen for lengthwise members 16A, 16B and 18A″ and 18B″, that do not incorporate an outer rubber coating. In such embodiment, filtering material 14 is held between frames 16 and 18″ and stretched by frame 18″. Slippage of filtering material 14, however, is somewhat prevented by ears 26 penetrating filtering material 14.

Figure 8:
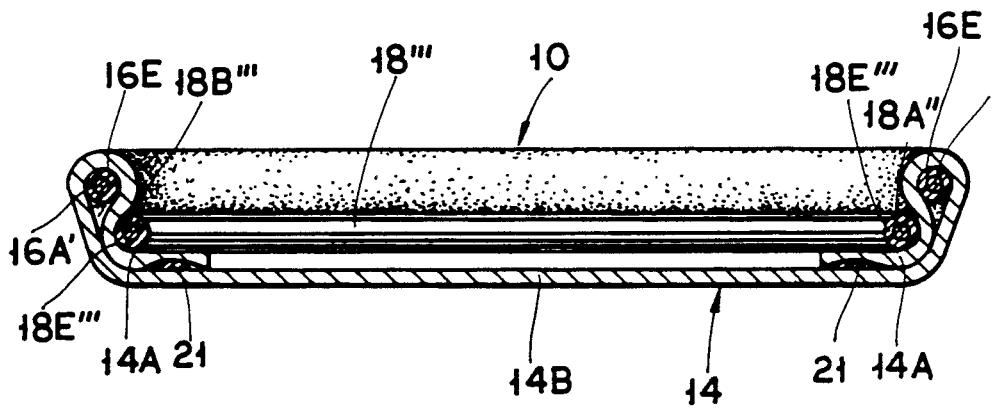
FIG. 8 is a cross-sectional view of another embodiment of an assembled filter unit.

Since the rubber coating constitutes an inventive aspect in and of itself, exclusive of the ear members of the present invention, the embodiment of FIG. 8 incorporates frames 16 and 18‴ that do not have cross-braces, ear members, etc. The filtering material 14 is simply held by frames 16′ and 18‴ and stretched by frame 18‴. Slippage of the filtering material 14 is prevented solely by covering 16E and 18E‴ respectively applied to first and second frame 16′ and 18‴. As may be appreciated, it is possible to form an embodiment of the present invention without cross-braces, ear members, etc. in which covering 18E is applied only to second frame 18 as in the illustrated embodiments of FIGS. 1 through 6. Moreover, although not illustrated, first frame 16 of the embodiments illustrated in FIGS. 1 through 6 could also be formed with an outer covering of cushioning material 16E or, alternately, a filter unit in accordance with the present invention could be formed with covering of cushioning material 16E solely applied to first frame 16.

While specific embodiments of the invention have been shown and described, it will be obvious to those skilled in the art that various changes and modifications may be made therein without departing from the scope of the invention and the invention should not be considered as limited to these embodiments, but only as limited by the appended claims.

I claim:
1. A filter unit comprising:
first and second similarly and complementary shaped frame means;
said first frame means including a frame for mounting a stretchable sheet of filtering material, said first frame being a quadrangularly-shaped closed member having a circular cross-section;
said stretchable sheet of filtering material being sized larger than said first frame and having a central portion for filtration and a marginal portion surrounding said central portion for peripherally sealing the filter unit, said marginal portion being folded over said quadrangularly-shaped closed member and doubled over said central portion;
said second frame means also being a quadrangularly-shaped closed member having a circular cross-section receivable within and below said first frame and against said marginal portion of said sheet of filtering material for stretching thereof and for bearing against said marginal portion thereof such that said sheet of filtering material is tightly held solely between said first and said second frames and said marginal portion of said sheet of filtering material preventing air leaks between said first and said second frame means; and
mechanical interconnection means extending from said second frame means, said mechanical interconnection means including at least one pair of oppositely disposed ear members extending from a peripheral outer surface of said closed member of said second frame for penetrating through said marginal portion of said sheet of filtering material at, at least one pair of opposite locations adjacent said first and said second frame means and contacting the outer periphery of a peripheral outer surface of a side of said first frame so that said first frame means is held between at least said one pair of said ear members for reinforcing said first frame means by said second frame means, and said ear members conjointly with said first and said second frames preventing slippage of said sheet of filtering material from said first and said second frame means.

2. The filter unit of claim 1, wherein:
each of said first and said second frames has an essentially rectangular configuration and each includes a pair of lengthwise members and a pair of transverse members; and
said at least one pair of ear members extend from said lengthwise members of said second frame.

3. The filter unit of claim 1, wherein said second frame is dimensioned slightly smaller than said first frame and said at least one pair of ear members are connected to lengthwise members of said second frame and are angled outwardly from the vertical to contact lengthwise members of said first frame complementary to said lengthwise members of said second frame.

4. The filter unit of claim 1, wherein including reinforcement means connected with said ear members and comprising a pair of spaced cross-braces connected to said lengthwise members of said second frame, each of said cross-braces having upwardly bent end portions forming two of said at least one pair of ear members, and said ear members being uniformly continuous with said cross-braces.

5. The filter unit of claim 1, wherein said at least one pair of ear members penetrate through said marginal portion of said sheet at another pair of opposite locations located above said at least one pair of opposite locations.

6. The filter unit of claim 5, wherein said opposite locations are located on opposite sides of said central portion.

7. The filter unit of claim 1, wherein:
each of said first and said second frames has an essentially rectangular configuration and includes a pair of lengthwise members and a pair of transverse members, one of said lengthwise members having a greater extent than the other of said lengthwise members, and
said at least one pair of ear members extend from both said lengthwise members of said second frame.

8. The filter unit of claim 7, wherein said second frame is dimensioned slightly smaller than said first frame and said at least one pair of ear members are each connected with a peripheral outer surface of said second frame and are outwardly angled from the vertical to contact said lengthwise members of said first frame when in their assembled condition for sandwiching a portion of said marginal portion therebetween.

9. The filter unit of claim 8, including reinforcement means connected with said lengthwise members of said second frame means and including a pair of spaced cross-braces uniformly continuous with said ear members connected to said lengthwise members of said second frame, some of said ear members including parts formed from upwardly bent end portions of said cross-braces and extending outwardly of said first and said second frames.

10. The filter unit of claim 1, wherein said second frame includes cushioning means on the outer peripheral surface thereof for insuring a tight fit between said sheet of filtering material and said first and said second frames, and said first frame being free of said cushioning means and cooperating with said ear members in contact with the outer peripheral surface thereof thereby further preventing slippage of said sheet of filtering material.

11. The filter unit of claim 10, wherein said cushioning means is a gasket and comprises a coating of rubber material covering said second frame.

12. The filter unit of claim 2, wherein said at least one pair of said ear members penetrate said marginal portion of said sheet at another pair of opposite locations located above said at least one pair of opposite locations;
said opposite locations are located on opposite sides of said central portion; and
said second frame means includes a gasket covering said second frame for insuring a tight fit between said sheet of filtering material and said first and said second frames thereby further preventing slippage of said sheet of filtering material.

13. The filter unit of claim 12, wherein said gasket comprises a coating of rubber covering said second frame.

14. A filter unit comprising:
first and second frame means each including first and second complementary frames for mounting a non-apertured stretchable sheet of filtering material, each of said frame having an outer surface portion;
said stretchable sheet of filtering material being sized larger than said first frame and having a central portion for filtration and a marginal portion surrounding said central portion for peripherally sealing the filter unit, said marginal portion being folded over the outer surface portion of said first frame for substantially covering over said outer surface of said first frame and doubled over and overlying a portion of said central portion;
said second frame means being receivable within and below said first frame means and overlying against such doubled over marginal portion of said sheet of filtering material for stretching said central portion thereof and for bearing against said marginal portion thereof such that said sheet of filtering material is tightly held between said first and second frames and said marginal portion of said sheet of filtering material prevents air leaks between said first and second frames; and
cushioning means including a gasket material connected to and surrounding the outer peripheral surface of said second frame for insuring a tight fit among said sheet of filtering material, said first and second frames thereby preventing slippage of said sheet of filtering material from between said first and said second frames.

15. The filter unit of claim 14, wherein said gasket material includes a rubber coating covering for preventing the slippage of said filtering material from between said first and said second frames.

16. The filter unit of claim 14, wherein each of said first and said second frames has an essentially rectangular configuration and includes a pair of lengthwise members and a pair of transverse members, and said cushioning means comprises a rubber coating covering each said lengthwise and each said transverse members of both said first and said second frames.

17. The filter unit of claim 14, including ear members coupled with said second frame for penetrating the marginal portions of said stretchable sheet and contacting a portion of the outer peripheral surface of said first frame.

18. The filter unit of claim 14, wherein said second frame is dimensioned slightly smaller than said first frame.

19. A method of forming a filter unit suitable for filtering air, comprising:
fabricating a stretchable sheet of filtering material having a central portion for filtration and a marginal holding portion surrounding said central portion for peripherally sealing the filter unit;
mounting said sheet of filtering material to a first frame having a substantially cylindrical cross-section, the outer peripheral extent of said first frame being sized smaller than the outer peripheral extent of said sheet of filtering material, by folding said marginal holding portion over said first frame and doubling said marginal portion over onto a portion of said central portion;
receiving a second frame complementary to said first frame for holding said marginal holding portion therebetween and within and below said first frame, said second frame being dimensioned slightly smaller than said first frame, so that said second frame bears against said marginal portion of said sheet of filtering material and stretches said sheet of filtering material to hold said sheet of filtering material between said first and said second frame for preventing air leaks between said first and said second frames;
positioning at least one pair of oppositely disposed ear members, connected to said second frame and outwardly angled from the vertical to forcibly contact the outer periphery of said first frame, against said marginal portion of said sheet of filtering material when said second frame is receiving within and below said first frame, for mechanically interconnecting said first and said second frames therebetween with said sheet of filtering material; and
puncturing said sheet of filtering material with said at least one pair of ear members at at least one pair of opposite locations located adjacent to said first and second frames so that said first frame is tightly held between said at least one pair of ear members to thereby reinforce said first frame by said second frame and to thereby prevent slippage of said sheet of filtering material out from between said first and said second frames.

20. The method of claim 19, wherein said sheet of filtering material is punctured at another pair of opposite locations, located above said at least one pair of opposite locations, with said ear members and said ears extend beyond and above the outer peripheral surface of said first frame.

* * * * *